US011459906B2

(12) United States Patent
Ortiz et al.

(10) Patent No.: US 11,459,906 B2
(45) Date of Patent: Oct. 4, 2022

(54) ACTIVELY-DRIVEN BLEED SOURCE SWITCHING

(71) Applicant: United Technologies Corporation, Farmington, CT (US)

(72) Inventors: Jonathan Ortiz, Torrance, CA (US); William K. Ackermann, East Hartford, CT (US); Matthew P. Forcier, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 160 days.

(21) Appl. No.: 15/601,544

(22) Filed: May 22, 2017

(65) Prior Publication Data

US 2018/0334918 A1  Nov. 22, 2018

(51) Int. Cl.
*F01D 21/00* (2006.01)
*F01D 25/12* (2006.01)
(Continued)

(52) U.S. Cl.
CPC ............. *F01D 17/105* (2013.01); *F01D 5/02* (2013.01); *F01D 17/145* (2013.01); *F01D 21/003* (2013.01); *F01D 25/12* (2013.01); *F02C 7/12* (2013.01); *F02C 9/18* (2013.01); *F04D 27/009* (2013.01); *F05D 2220/32* (2013.01); *F05D 2260/606* (2013.01)

(58) Field of Classification Search
None
See application file for complete search history.

(56) References Cited

U.S. PATENT DOCUMENTS 4,991,389 A * 2/1991 Schafer ................... F02C 9/18
60/39.24
6,202,403 B1   3/2001 Laborie et al.
(Continued)

FOREIGN PATENT DOCUMENTS

EP   2407652 A1   1/2012
EP   2439390 A1   4/2012

OTHER PUBLICATIONS

SanjaY Bhat, Parker Aerospace's Fluid Systems Division, 2017, Maintaining Turbine Clearance Control of Aircraft Gas Turbines.*
(Continued)

*Primary Examiner* — Todd E Manahan
*Assistant Examiner* — Rodolphe Andre Chabreyrie
(74) *Attorney, Agent, or Firm* — Cantor Colburn LLP

(57) ABSTRACT

A bleed air cooling system for a gas turbine engine includes one or more bleed flowpaths operably connected to a bleed outlet to divert a bleed airflow from a gas turbine engine flowpath. Each bleed flowpath includes two or more bleed ports to divert a bleed airflow from a gas turbine engine flowpath, and a bleed duct in fluid communication with the bleed ports and configured to convey the bleed airflow from the two or more bleed ports to the bleed outlet. A valve is located at each bleed port of and is configured to move between an opened position and a closed position, and one or more sensors are located along the bleed flowpath to sense one or more conditions of the bleed air cooling system. The valve at a particular bleed port is moved to the opened position based on the sensed one or more conditions.

12 Claims, 3 Drawing Sheets

(51) Int. Cl.
*F02C 7/12* (2006.01)
*F02C 9/18* (2006.01)
*F01D 17/10* (2006.01)
*F01D 17/14* (2006.01)
*F01D 5/02* (2006.01)
*F04D 27/00* (2006.01)

(56) References Cited

U.S. PATENT DOCUMENTS

| | | |
|---|---|---|
| 8,397,487 B2 | 3/2013 | Sennoun et al. |
| 8,967,528 B2 | 3/2015 | Mackin et al. |
| 9,062,604 B2 | 6/2015 | Defrancesco |
| 9,234,707 B2 | 1/2016 | Mackin et al. |
| 2005/0109016 A1* | 5/2005 | Ullyott ............ F01D 11/24 60/282 |
| 2007/0137213 A1* | 6/2007 | Rickert ............ F02C 7/125 60/782 |
| 2009/0037035 A1* | 2/2009 | Hershey ............ F01D 11/24 701/3 |
| 2015/0104289 A1* | 4/2015 | Mackin ............ F01D 17/105 415/1 |
| 2015/0233291 A1 | 8/2015 | Pelagatti et al. |
| 2015/0251765 A1 | 9/2015 | Jonqueres et al. |
| 2015/0275758 A1* | 10/2015 | Foutch ............ F02C 7/047 60/779 |
| 2017/0002740 A1* | 1/2017 | Robson ............ F01D 25/12 |
| 2017/0233081 A1* | 8/2017 | Sautron ............ B64D 13/02 60/783 |
| 2017/0234224 A1* | 8/2017 | Adibhatla ............ G05B 23/0289 60/226.1 |
| 2019/0128192 A1* | 5/2019 | Panov ............ F02C 9/28 |

OTHER PUBLICATIONS

European Search Report for application EP 18173682.8, dated Sep. 20, 2018, 8 pages.

* cited by examiner

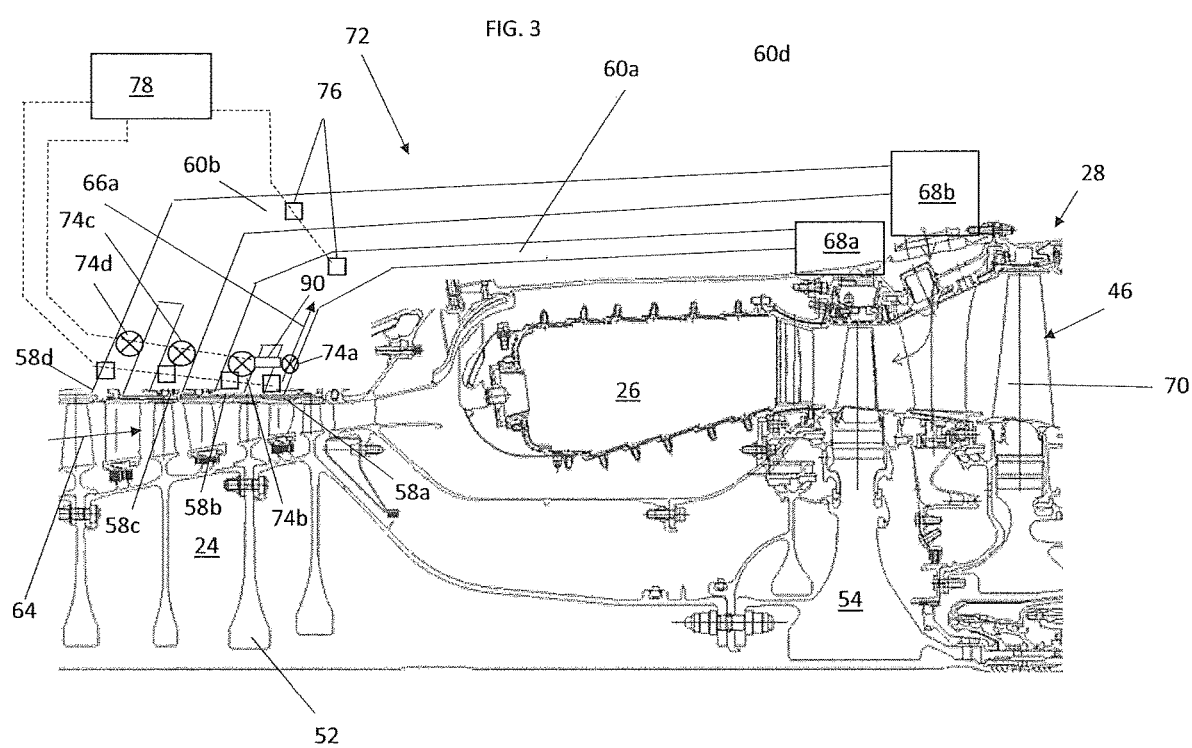

ACTIVELY-DRIVEN BLEED SOURCE SWITCHING

BACKGROUND

Exemplary embodiments pertain to the art of gas turbine engines. More particularly, the present disclosure relates to cooling of components of the gas turbine engine via bleed air flow.

Gas turbine engines are known and typically include a fan delivering air into a bypass duct as propulsion air. Further, the fan delivers air into a compressor section where it is compressed. The compressed air passes into a combustion section where it is mixed with fuel and ignited. Products of this combustion pass downstream over turbine rotors driving them to rotate.

In a gas turbine engine, cooling air is often provided from the compressor to the turbine section to reduce component temperature in the turbine section and improve overall gas turbine engine operation. In some gas turbine engines, air from the high compressor discharge is passed through a heat exchanger, which may be located in a fan bypass duct and then delivered into the turbine section as cooling air. The air from the downstream most end of the compressor section is at elevated temperatures, relative to air at other portions of the compressor section.

Running the operating temperatures in the turbine section at high temperatures provides efficiency gains in the gas turbine engine; however, the high temperatures are exceeding material limits and are driving the need for improved cooling air. That is, conventional cooling air methods often require large amounts of airflow to provide cooling air at sufficient pressure to be introduced to the highest pressure places of the gas turbine engine and at cool enough temperature to reduce key component temperatures.

BRIEF DESCRIPTION

In one embodiment, a bleed air cooling system for a gas turbine engine includes one or more bleed flowpaths operably connected to a bleed outlet to divert a bleed airflow from a gas turbine engine flowpath. Each bleed flowpath includes two or more bleed ports located at a separate axial location of the gas turbine engine to divert a bleed airflow from a gas turbine engine flowpath, and a bleed duct in fluid communication with the bleed ports and configured to convey the bleed airflow from the two or more bleed ports to the bleed outlet. A valve is located at each bleed port of the two or more bleed ports configured to move between an opened position and a closed position, and one or more sensors are located along the bleed flowpath to sense one or more conditions of the bleed air cooling system. The valve at a particular bleed port is moved to the opened position based on the sensed one or more conditions.

Additionally or alternatively, in this or other embodiments the one or more sensors are located downstream of the valve.

Additionally or alternatively, in this or other embodiments the one or more sensors are located upstream of the valve.

Additionally or alternatively, in this or other embodiments the sensors are one or more of pressure sensors and temperature sensors.

Additionally or alternatively, in this or other embodiments each bleed port is located at a different axial location of the gas turbine engine.

Additionally or alternatively, in this or other embodiments the axial locations are axial locations of a high pressure compressor section of the gas turbine engine.

Additionally or alternatively, in this or other embodiments the one or more bleed flowpaths are in flow communication with a turbine manifold.

Additionally or alternatively, in this or other embodiments a controller is configured to open and close the valves based on data received from the one or more sensors.

Additionally or alternatively, in this or other embodiments a first valve at a first bleed port of the two or more bleed ports is mechanically connected to a second valve at a second bleed port of the two or more bleed ports, such that opening of the first valve forces closure of the second valve via the mechanical connection.

In another embodiment, a gas turbine engine includes a compressor section, a turbine section operably connected to the compressor section, and a bleed air cooling system. The bleed air cooling system includes one or more bleed flowpaths operably connected to a bleed outlet to divert a bleed airflow from a gas turbine engine flowpath. Each bleed flowpath includes two or more bleed ports located at a separate axial location of the gas turbine engine to divert a bleed airflow from a gas turbine engine flowpath, and a bleed duct in fluid communication with the bleed ports and configured to convey the bleed airflow from the two or more bleed ports to the bleed outlet. A valve is located at each bleed port of the two or more bleed ports configured to move between an opened position and a closed position, and one or more sensors are located along the bleed flowpath to sense one or more conditions of the bleed air cooling system. The valve at a particular bleed port is moved to the opened position based on the sensed one or more conditions.

Additionally or alternatively, in this or other embodiments the one or more sensors are disposed downstream of the valve.

Additionally or alternatively, in this or other embodiments the one or more sensors are disposed upstream of the valve.

Additionally or alternatively, in this or other embodiments the sensors are one or more of pressure sensors and temperature sensors.

Additionally or alternatively, in this or other embodiments each bleed port is located at a different axial location of the gas turbine engine.

Additionally or alternatively, in this or other embodiments the axial locations are axial locations of a high pressure compressor section of the gas turbine engine.

Additionally or alternatively, in this or other embodiments the one or more bleed flowpaths are in flow communication with a turbine manifold.

Additionally or alternatively, in this or other embodiments a controller is configured to open and close the valves based on data received from the one or more sensors.

Additionally or alternatively, in this or other embodiments a first valve at a first bleed port of the two or more bleed ports is mechanically connected to a second valve at a second bleed port of the two or more bleed ports, such that opening of the first valve forces closure of the second valve via the mechanical connection.

In yet another embodiment, a method of cooling one or more components of a gas turbine engine includes sensing one or more conditions via one or more sensors located at one or more bleed flowpaths each located at an axial location of a compressor section of a gas turbine engine and selectably urging a bleed airflow through a first bleed port of two or more bleed ports of the bleed flowpath based on the one or more sensed conditions via operation of a valve located at each bleed port of the two or more bleed ports. The bleed airflow is flowed through a bleed duct of the bleed flowpath toward a bleed outlet disposed at a cooling location.

Additionally or alternatively, in this or other embodiments the bleed airflow through the first bleed port is stopped and the bleed airflow through a second bleed port of the two or more bleed ports is started via selective operation of the plurality of the valves in response to the one or more sensed conditions.

BRIEF DESCRIPTION OF THE DRAWINGS

The following descriptions should not be considered limiting in any way. With reference to the accompanying drawings, like elements are numbered alike:

FIG. 3 is a schematic via of another embodiment of a bleed system for a gas turbine engine.

DETAILED DESCRIPTION

A detailed description of one or more embodiments of the disclosed apparatus and method are presented herein by way of exemplification and not limitation with reference to the Figures.

Figure 1:
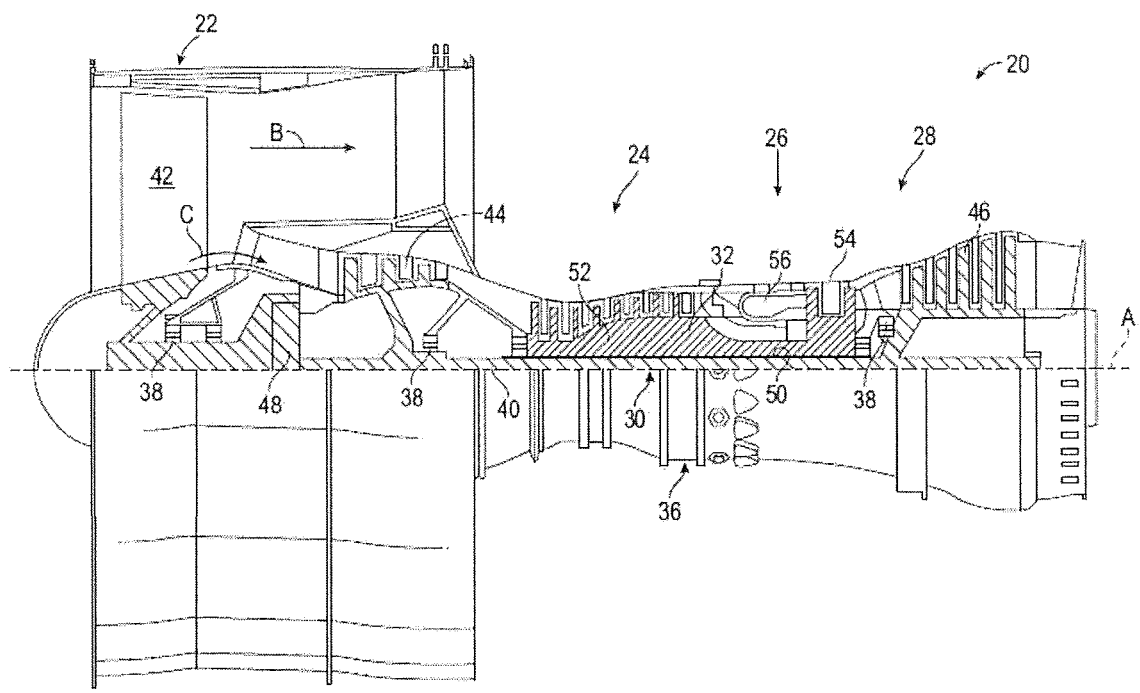
FIG. 1 is cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
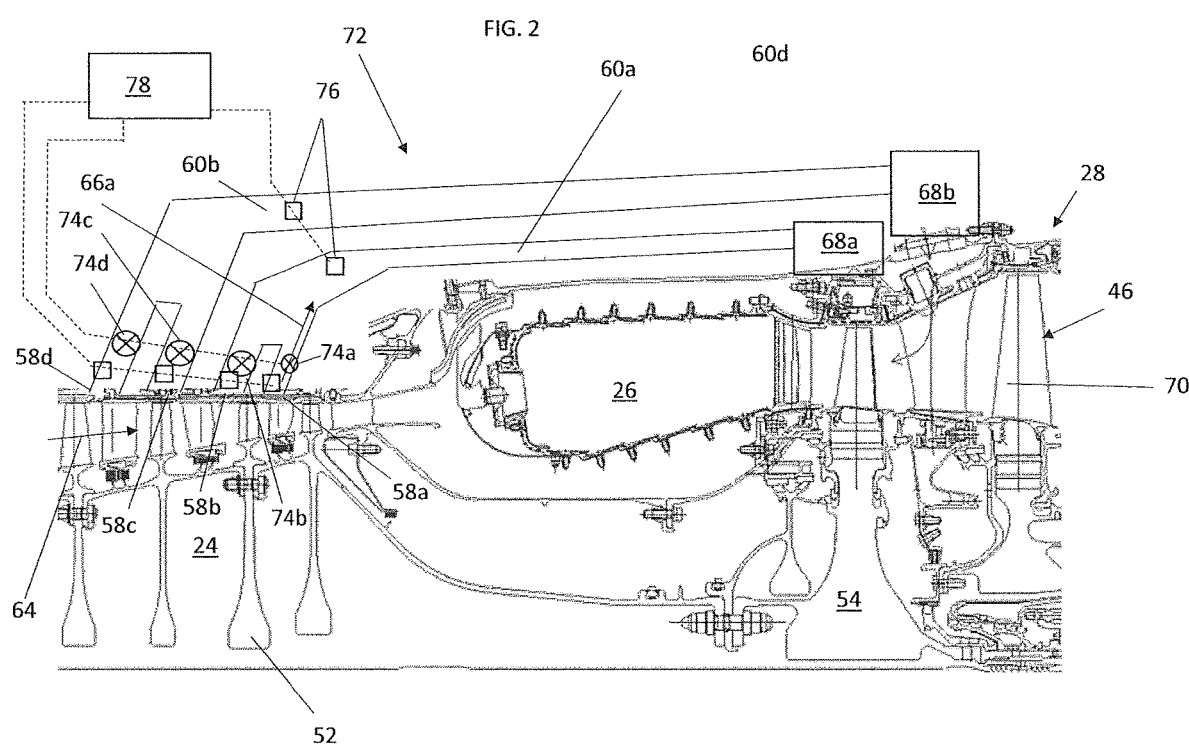
FIG. 2 is a schematic view of an embodiment of a bleed system for a gas turbine engine.

Referring now to FIG. 2, illustrated is an embodiment of a bleed air cooling system 72 for the gas turbine engine 10. In this embodiment, the compressor section 24 includes a plurality of bleed ports 58 each connected to a bleed duct 60.

In some embodiments, each bleed port 58 is located at a unique axial location of the high pressure compressor 52 to divert high pressure compressor airflow 64 from the high pressure compressor 52 into a bleed duct 60 as bleed airflow 66. The bleed airflow 66 is directed downstream along the bleed duct 60 to one or more locations of, for example, the turbine section 28 to provide cooling for one or more components thereat. In the embodiment of FIG. 2, each bleed duct 60 is connected to a turbine manifold 68. The turbine manifold 68 extends at least partially around a perimeter of the turbine section 28 to allow for distribution of the bleed airflow 66 to multiple circumferential locations of the turbine section 28. In some embodiments, the turbine manifold 68 extends completely around the perimeter of the turbine section 28. The bleed airflow 66 flows from the turbine manifold 68 via a bleed outlet 80 to cool one or more components of the turbine section 28, for example, one or more turbine airfoils 70.

For example, FIG. 2 illustrates and embodiment having four bleed ports 58a-58d, with bleed ports 58a and 58b connected to turbine manifold 68a located at, for example, the high pressure turbine 54 via corresponding bleed duct 60a. Likewise, bleed ports 58c and 58d are connected to turbine manifold 68b located at, for example, the low pressure turbine 46 via bleed duct 60b. A valve 74 is positioned at each bleed port 58a-58d to control the flow of bleed air 66 through each of the bleed ports 58a-58d and through bleed ducts 60a, 60b, allowing for selection of bleed airflow 66 source location among bleed ports 58a-58d, depending on operating conditions and/or conditions at the cooling location. The valves 74 selectably direct bleed airflow 66 to the turbine manifolds 68a, 68b based on one or more gas turbine engine 10 operating conditions. More specifically, the valves 74 control the flow of bleed airflow 66 from the bleed ports 58a-58d to the turbine manifolds 68a, 68b based on operating conditions of the gas turbine engine 10 and cooling needs of the one or more turbine section 28 components.

While in the embodiments illustrated and described herein, two turbine manifolds 68 are illustrated with two bleed ports 58 connected to each turbine manifold 68, one skilled in the art will readily appreciate that the present disclosure may be applied to other systems having, for example, three or more turbine manifolds 68, and/or three or more bleed ports 58 connected to a turbine manifold 68. Further, the bleed ports 58 may be located at any compressor 24 location, such as high pressure compressor 52, low pressure compressor 44 or fan 42, with the turbine manifold 68 located to provide cooling to any downstream location, such as high pressure turbine 54 or low pressure turbine 46. Further, in some embodiments, two or more bleed ports 58 may be located at a same axial location of the compressor 24, and may distribute bleed airflow 66 to two or more turbine manifolds 68 at different location of the turbine section 28, such as the high pressure turbine 54 or low pressure turbine 46.

One or more sensors 76 are located in the bleed air cooling system 72, for example downstream of the valves 74 as shown in FIG. 2 and/or at the turbine manifold 68 and/or at the turbine section 28 or at another location upstream and/or downstream of the valves 74. The one or more sensors 76 may be, for example, pressure sensors and/or temperature sensors to sense one or more conditions at the bleed air cooling system 72, for example, pressure and/or temperature downstream of the valves 74. The one or more sensors 76 are operably connected to a controller 78, which is also connected to the valves 74. The valves 74, sensors 76 and the controller 78 are configured to actively control the bleed airflow 66 by actively selected the bleed airflow 66 source or sources from the bleed ports 58a-58d. The controller 78 analyzes the data from the sensors 76 to determine a correct bleed airflow 66 source based on the data from the sensors 76. The controller 78 will then command opening of the appropriate valve 74 thereby directing the bleed airflow 66 through one or more of the bleed ports 58a-58d, along the corresponding one or more bleed ducts 60 to the one or more turbine manifolds 68 for cooling of the components of the turbine section 28. As the controller 78 determines that conditions have changed sufficiently via changes in data from the downstream sensors 76, the controller 78 may command closure of a first valve 74 and opening of a second valve 74, thereby changing the source of the bleed airflow 66 in response to the change in conditions.

For example, in the embodiment of FIG. 2, sensors 76 and controller 78 determine the appropriate bleed airflow source selected from bleed ports 58a and 58b to flow appropriate bleed airflow 66a along bleed duct 60a to turbine manifold 68a. Likewise sensors 76 and controller 78 are utilized to select a bleed airflow source from bleed ports 58c and 58d to flow the appropriate bleed airflow 66b along bleed duct 60b to turbine manifold 68b.

In some embodiments, the bleed air cooling system 72 further includes a plurality of upstream sensors 82 located upstream of the valves 74 and connected to the controller 78. The plurality of upstream sensors 76 to sense conditions, such as pressure or temperature in the high pressure compressor section 52. By sensing the conditions in the high pressure compressor 52 via the upstream sensors 82 and the conditions downstream of the valves 74 via the downstream sensors 76, the controller 78 can more precisely select correct bleed sources from the bleed ports 58a-58d.

In another embodiment, illustrated in FIG. 3, valve 74a and valve 74b are configured not to operate independently as described above, but are mechanically connected via, for example, a linkage 90. The valve for the lower pressure bleed source, in this embodiment valve 74b operates based on data from sensors 76 and/or 82 to determine whether bleed airflow 66a from bleed port 58b is adequate to cool the desired components, and as the valve 74b opens, valve 74a would automatically close via the linkage 90.

In some embodiments, the controller 78 may further include features to utilize feedback from valves 74a-74d to ensure the correct valve position is achieved and/or maintained. Further, the controller may include or utilize logic to identify and mitigate the effects of sensors 76, 82 which are malfunctioning, damaged or otherwise in a fault state. In addition to utilizing data from sensors 76, 82 to select bleed airflow 66 sources from among bleed ports 58a-58d, the controller may also utilize any available engine or aircraft control parameters or available engine or aircraft system position indicator to choose the appropriate bleed airflow source(s) from bleed ports 58a-58d. Further, the control logic may vary between that for turbine manifold 68a and that for turbine manifold 68b.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bleed air cooling system for a gas turbine engine, comprising:
   a bleed outlet;
   one or more bleed flowpaths operably connected to the bleed outlet to divert a bleed airflow from a gas turbine engine flowpath, each bleed flowpath including:
      two or more bleed ports disposed at a separate axial location of the gas turbine engine to divert the bleed airflow from a gas turbine engine flowpath;
      a bleed duct in fluid communication with the bleed ports and configured to convey the bleed airflow from the two or more bleed ports to the bleed outlet;
      a valve disposed at each bleed port of the two or more bleed ports configured to move between an opened position and a closed position;
      one or more sensors disposed along the bleed flowpath to sense one or more conditions of the bleed airflow along the bleed flowpath; and
   one or more turbine manifolds disposed at a turbine section of the gas turbine engine and extending at least partially circumferentially around the turbine section, the one or more bleed flowpaths operably connected to the bleed outlet via the one or more turbine manifolds, the one or more turbine manifolds configured to provide the bleed airflow to one or more components of the turbine section to cool the one or more components;
   wherein the one or more sensors are disposed along the bleed flowpath downstream of the valve between the valve and the one or more turbine manifolds; and
   a controller configured to move the valve at a particular bleed port to the opened position based on the sensed one or more conditions, thereby selecting a source of the bleed airflow from the two or more bleed ports based on the sensed one or more conditions;
   wherein the controller utilizes feedback from the valves to ensure a correct valve position is achieved and maintained; and
   wherein the controller identifies and mitigates the effects of sensors of the one or more sensors which malfunction;
   wherein the valve disposed at a first bleed port of the two or more bleed ports is mechanically connected to the valve disposed at a second bleed port of the two or more bleed ports via a linkage, such that opening of the valve disposed at the first bleed port forces closure of the valve disposed at the second bleed port via the mechanical connection.

2. The bleed air cooling system of claim 1, wherein an additional one or more sensors are disposed upstream of the valve.

3. The bleed air cooling system of claim 1, wherein the sensors are one or more of pressure sensors and temperature sensors.

4. The bleed air cooling system of claim 1, wherein the axial locations are axial locations of a high pressure compressor section of the gas turbine engine.

5. The bleed air cooling system of claim 1, wherein the controller is configured to open and close the valves based on data received from the one or more sensors.

6. A gas turbine engine, comprising:
   a compressor section;
   a turbine section operably connected to the compressor section; and
   a bleed air cooling system, comprising:
      two or more bleed flowpaths operably connected to a bleed outlet to divert a bleed airflow from a gas turbine engine flowpath, each bleed flowpath including:
         two or more bleed ports disposed at a separate axial location of the gas turbine engine to divert the bleed airflow from a gas turbine engine flowpath;
         a bleed duct in fluid communication with the bleed ports and configured to convey the bleed airflow from the two or more bleed ports to the bleed outlet;
         a valve disposed at each bleed port of the two or more bleed ports configured to move between an opened position and a closed position; and
         one or more sensors disposed along the bleed flowpath to sense one or more conditions of the bleed airflow along the bleed flowpath; and
         one or more turbine manifolds disposed at the turbine section and extending at least partially circumferentially around the turbine section, the bleed flowpath operably connected to the bleed outlet via the one or more turbine manifolds, the one or more turbine manifolds configured to provide the bleed airflow to one or more components of the turbine section to cool the one or more components;
      wherein a first bleed flowpath of the two or more bleed flowpaths is configured to deliver a first bleed airflow to a high pressure turbine of the turbine section, and a second bleed flowpath of the two or more bleed flowpaths is configured to deliver a second bleed airflow to a low pressure turbine of the turbine section;
      wherein the one or more sensors are disposed along the bleed flowpath downstream of the valve between the valve and the one or more turbine manifolds; and
      a controller configured to move the valve at a particular bleed port to the opened position based on the sensed one or more conditions, thereby selecting a source of the bleed airflow from the two or more bleed ports based on the sensed one or more conditions;
      wherein the controller utilizes feedback from the valves to ensure a correct valve position is achieved and maintained; and
      wherein the controller identifies and mitigates the effects of sensors of the one or more sensors which malfunction;
      wherein the valve disposed at a first bleed port of the two or more bleed ports is mechanically connected to the valve disposed at a second bleed port of the two or more bleed ports via a linkage, such that opening of the valve disposed at the first bleed port forces closure of the valve disposed at the second bleed port via the mechanical connection.

7. The gas turbine engine of claim 6, wherein an additional one or more sensors are disposed upstream of the valve.

8. The gas turbine engine of claim 6, wherein the sensors are one or more of pressure sensors and temperature sensors.

9. The gas turbine engine of claim 6, wherein the axial locations are axial locations of a high pressure compressor section of the gas turbine engine.

10. The gas turbine engine of claim 6, wherein the controller is further configured to open and close the valves based on data received from the one or more sensors.

11. A method of cooling one or more components of a gas turbine engine, comprising:
  sensing one or more conditions of a bleed airflow via one or more sensors disposed at one or more bleed flowpaths each disposed at an axial location of a compressor section of the gas turbine engine;
  selectably urging a bleed airflow through a first bleed port of two or more bleed ports of the one or more bleed flowpaths based on the one or more sensed conditions via operation of a valve disposed at each bleed port of the two or more bleed ports; and
  flowing the bleed airflow through a bleed duct of the one or more bleed flowpaths toward a bleed outlet via one or more turbine manifolds disposed at a turbine section of a gas turbine engine and extending at least partially circumferentially around the turbine section, the one or more bleed flowpaths operably connected to the bleed outlet via the one or more turbine manifolds, the one or more turbine manifolds configured to provide the bleed airflow to one or more components of the turbine section to cool the one or more components;
  wherein the one or more sensors are disposed along the one or more bleed flowpaths downstream of the valve between the valve and the one or more turbine manifolds; and
  utilizing feedback from the valves to ensure that a correct valve position is achieved and maintained;
  wherein a controller identifies and mitigates the effects of sensors of the one or more sensors which malfunction;
  wherein the valve disposed at a first bleed port of the two or more bleed ports is mechanically connected to the valve disposed at a second bleed port of the two or more bleed ports via a linkage, such that opening of the valve disposed at the first bleed port forces closure of the valve disposed at the second bleed port via the mechanical connection.

12. The method of claim 11, further comprising:
stopping the bleed airflow through the first bleed port; and
starting the bleed airflow through a second bleed port of the two or more bleed ports via selective operation of the plurality of the valves in response to the one or more sensed conditions.

* * * * *